United States Patent [19]
Normile

[11] Patent Number: 5,812,200
[45] Date of Patent: Sep. 22, 1998

[54] METHOD AND APPARATUS FOR CONSTANT DATA RATE OUTPUT OF ENCODERS

[75] Inventor: James Oliver Normile, Woodside, Calif.

[73] Assignees: LG Electronics, Inc., San Jose; James Normile, Woodside, both of Calif.

[21] Appl. No.: 707,123

[22] Filed: Sep. 3, 1996

[51] Int. Cl.[6] .................................................. H04N 7/50
[52] U.S. Cl. ........................... 348/416; 340/19; 340/408
[58] Field of Search .................................. 348/402, 404, 348/405, 406, 407, 408, 416, 15, 19; H04N 7/50

[56] References Cited

U.S. PATENT DOCUMENTS

| | | | |
|---|---|---|---|
| 4,302,775 | 11/1981 | Wildergren | 348/408 |
| 5,050,230 | 9/1991 | Jones | 348/408 |
| 5,321,440 | 6/1994 | Yanagihara | 348/408 |
| 5,337,087 | 8/1994 | Mishima | 348/408 |
| 5,541,640 | 7/1996 | Larson | 348/408 |
| 5,583,657 | 12/1996 | Jeong | 348/408 |
| 5,666,161 | 9/1997 | Kohiyama | 348/408 |

*Primary Examiner*—Howard Britton
*Attorney, Agent, or Firm*—Peninsula Law Group; Daniel Hopen

[57] ABSTRACT

An apparatus for encoding data blocks and methods of operating the same result in an encoder that provides constant data rate outputs. The encoder comprises DCT (discrete cosine transformer) resources having a truncate controller configured to receive a truncate signal to truncate the data blocks to provide reduced data blocks. Quantizing resources is coupled to the DCT resources to quantize the reduced data blocks to provide quantized data blocks. Inverse quantizing resources is coupled to the quantizing resources to inverse quantize the quantized data blocks to provide inverse quantized data blocks. Frame reconstruction resources is coupled to the inverse quantizing resources to reconstruct previous compressed frames. Motion estimation resources is coupled to the frame reconstruction resources to provide predicted data blocks. Subtraction resources is coupled to the DCT resources and the motion estimation resources to subtract the data blocks and the predicted data blocks. An output data buffer having a data rate controller is coupled to the quantizing resources and the inverse quantizing resources to provide the truncate controller the truncate signal in response to excessive output image rates so that a constant output image rate is maintained.

20 Claims, 7 Drawing Sheets

(Previous Art)

(Previous Art)

METHOD AND APPARATUS FOR CONSTANT DATA RATE OUTPUT OF ENCODERS

BACKGROUND OF THE INVENTION

1. Field of the Invention

The present invention relates to maintaining constant data rate output of encoders and more particularly to manipulating parameters of the encoder to minimize impact on encoded data while maintaining the constant data rate output.

2. Description of the Related Arts

As the Internet becomes more and more popular, more and more data are being transferred using the Internet. Data compression is often used to reduce the amount of data for transmission over limited bandwidth channels such as the Internet. Most people access the Internet using fixed rate channels such as telephone lines. The fixed rate channels present problems for viewing video. Typically, as video images are compressed, the video compression process generates a variable data rate over time. The variable data rate is undesirable for fixed rate channels and causes jittery video images at the receiver.

Given that it is inherent for a video compression engine to generate a variable data rate over time, current techniques control the data rate of an video compression engine by changing a quantizer parameter in response to an error signal. However, merely controlling the quantizer parameter can severely impact the quality of the compressed images. Provisions are not available to control the quality of the compressed images from the video compression engine. Depending on the video images to be compressed, altering various components of the video compression engine is more advantageous in achieving improved compressed images over the current techniques of controlling a single parameter such as the quantizer parameter. Thus, increased degradation to the original image occurs when the data rate output of the video compression engine is controlled with the single parameter solution.

Therefore, it is desirable to provide an apparatus and methods of operating the same which constrain the video compression engine to generate a fixed amount of data per unit time that maintains flexibility in the compression engine to lessen degradation to the original image.

SUMMARY OF THE INVENTION

The present invention provides an apparatus for constant data rate output of encoders and methods for operating the same which result in improved compressed images. The novel constant data rate encoder is based on altering parameters of various components of the encoding engine. Thus, according to one aspect of the invention, a video encoder for encoding input images having a plurality of data blocks to provide output image data comprises DCT (discrete cosine transformer) resources having a truncate controller configured to receive a truncate signal to truncate the data blocks to provide reduced data blocks. Quantizing resources is coupled to the DCT resources to quantize the reduced data blocks to provide quantized data blocks. Inverse quantizing resources is coupled to the quantizing resources to inverse quantize the quantized data blocks to provide inverse quantized data blocks. Frame reconstruction resources is coupled to the inverse quantizing resources to reconstruct previous compressed frames. Motion estimation resources is coupled to the frame reconstruction resources to provide predicted data blocks. Subtraction resources is coupled to the DCT resources and the motion estimation resources to subtract the data blocks and the predicted data blocks. An output data buffer having a data rate controller coupled to the quantizing resources and the inverse quantizing resources provides the truncate controller the truncate signal in response to excessive output image rates so that a constant output image rate is maintained.

According to another aspect of the invention, the truncate controller selectively truncates the data blocks to provide the reduced data blocks in response to the truncate signal. Truncating the data blocks reduces the amount of data to be transferred and thus maintains the constant output image rate. The data blocks include a plurality of n x n blocks of data and the truncate controller truncates the n x n blocks to provide n−y×n−y blocks of reduced data blocks, where n represents an integer 8 and y represents an integer less than 8.

According to another aspect of the invention, each data block includes a plurality of x coordinate data and y coordinate data. The truncate controller includes an x-truncator which truncates the x coordinate data of the data blocks and a y-truncator which truncates the y coordinate data of the data blocks independent of the x truncator. Separate x-truncator and y-truncator provide finer control of the output image rate and of the compressed input image.

According to yet another aspect of the invention, pre-filtering resources is coupled to the DCT resources having image comparator resources configured to receive a threshold signal and compare input images to provide compared input images. Image averaging resources is configured to receive the compared input images and average the compared input images to provide input images having reduced data blocks. The pre-filtering resources includes texture averager resources configured to identify areas of an input image having high rates of change and average the areas of high rates of change in response to the threshold signal. The pre-filtering resources reduces compressed data by reducing noise components and texture and edge details of the input images.

According to another aspect of the invention, the data rate controller includes an image size control output configured to provide a reduction control signal, and the video encoder further comprises image reduction controller resources having an image reduction input configured to reduce image magnitudes in response to the reduction control signal. The data rate controller also includes a frame skipper control output configured to provide a frame skipping signal, and the video encoder further comprises frame skipping resources having a frame skipping input configured to skip image frames in response to the frame skipping signal. Reducing image sizes and skipping image frames reduce the output image data rates.

According to another aspect of the invention, the data rate controller includes a motion preference output configured to provide a preference signal in response to excessive output image data rates. The motion estimation resources includes motion preference resources having a preference input configured to set motion preference to prefer the zero vector in response to the preference signal.

An apparatus and method for operating a constant data rate output encoder are provided by controlling the parameters of various components of the encoder. Improved encoding of the data image is achieved through enhanced control of the parameters of the various components of the encoder. Also, the constant data rate of the encoder is more precisely controlled with the addition of more control parameters for the encoder.

Other aspects and advantages of the present invention can be seen upon review of the figures, the detailed description, and the claims which follow.

DETAILED DESCRIPTION OF THE INVENTION

Figure 1:
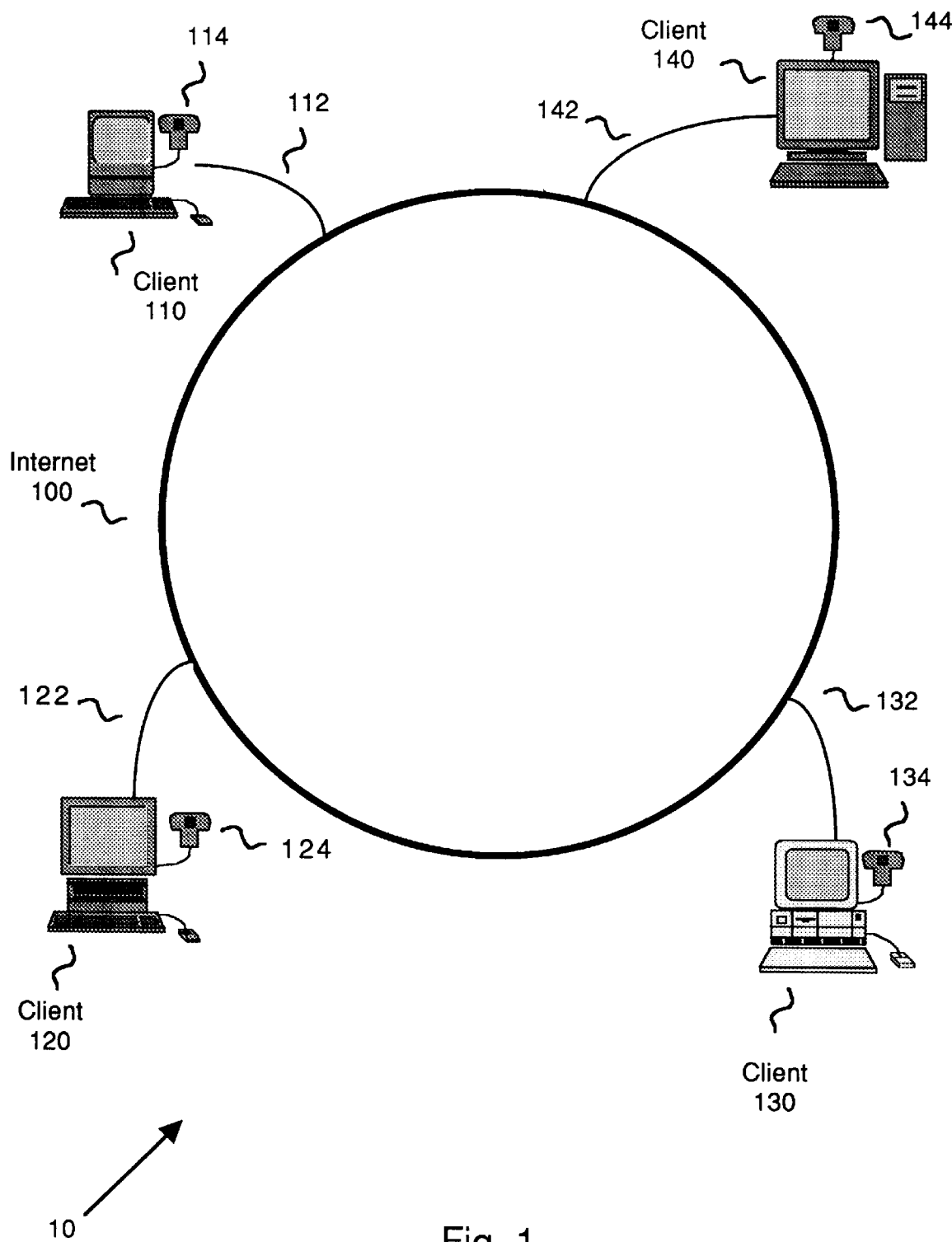
FIG. 1 illustrates a system level block diagram of a video conferencing system.

The invention will be described with respect to the Figures in which FIG. 1 generally shows a video conferencing system 10. The video conferencing system 10 includes an Internet 100, client 110, client 120, client 130, and client 140. The Internet 100 provides TCP/IP (Transmission Control Protocol over Internet Protocol). Other represented segments operating the TCP/IP including intranets and local area networks are also suitable.

Network connection 112 provides the client 110 access to the Internet 100. Network connection 122 provides the client 120 access to the Internet 100. Network connection 132 provides the client 130 access to the Internet 100. Network connection 142 provides the client 140 access to the Internet 100. Clients 110, 120, 130, and 140 include logic circuits that are programmed to perform a series of specifically identified operations for video conferencing on the Internet 100. Video camera 114 provides audio/video data from client 110 for transfer to another client on the Internet 100. Client 140 for example, is configured to receive the audio/video data from client 110 and transfers the audio/video data from camera 144 to client 110 on the Internet 100. Similarly, client 120 includes camera 124, and client 130 includes camera 134 for video conferencing on the Internet 100. Thus, clients 110, 120, 130, and 140 include video conferencing links via the Internet 100 to provide video conferencing between the clients.

Figure 2:
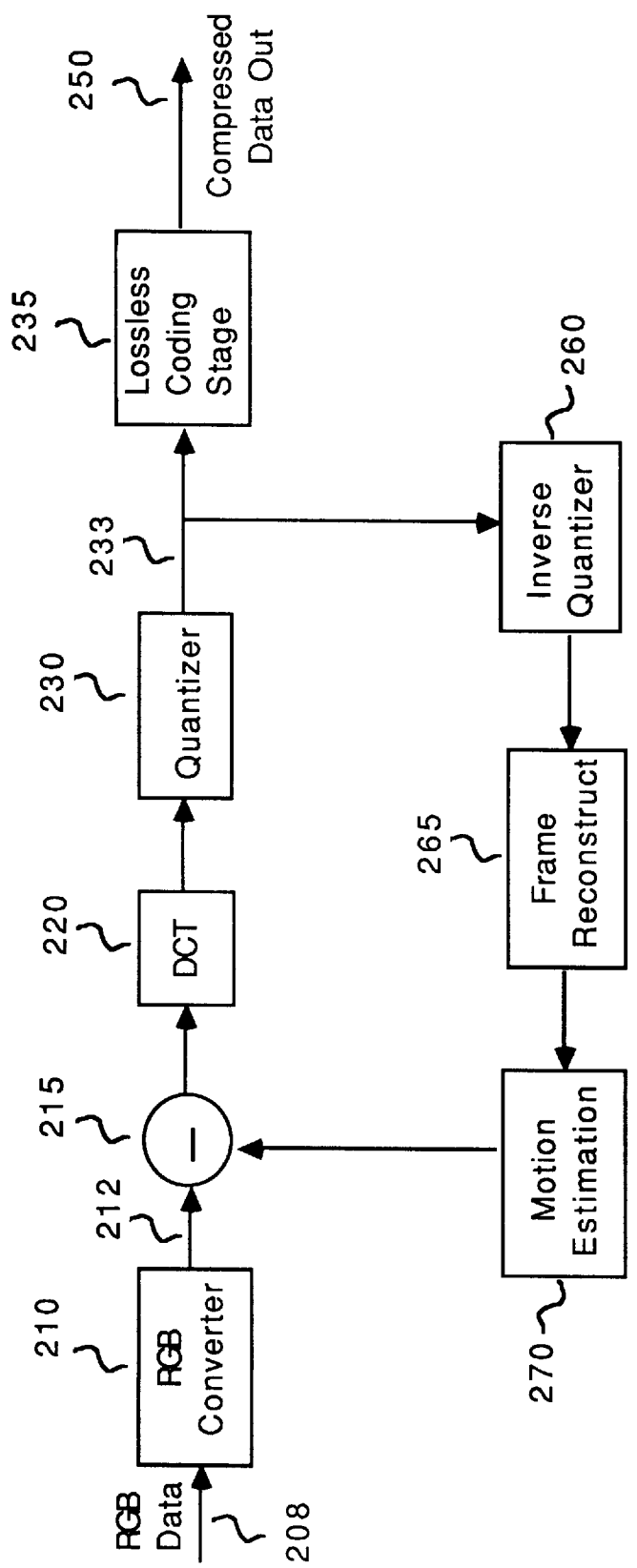
FIG. 2 illustrates a block diagram of a video encoder as generally known in the video encoding arts.

FIG. 2 shows a block diagram of a video encoder 20 as generally known in the video encoding arts. Red Green Blue (RGB) data on line 208 provides video input to RGB converter 210. The RGB converter 210 codes the RGB data to luminance and two color difference components y,u, and v, respectively. The RGB converter 210 provides an output on line 212 to a subtractor 215. The subtractor 215 subtracts the output from motion estimation block 270 and the yuv data on line 212. The Discrete Cosine Transform (DCT) block 220 provides the input to the quantizer 230. The output of the quantizer 230 on line 233 provides inputs to the inverse quantizer 260 and a lossless coding stage 235. The output of the inverse quantizer 260 provides the input to a frame reconstruct block 265. The motion estimation block 270 receives the output of the frame reconstruct block 265.

The DCT block 220, quantizer 230, inverse quantizer 260, the frame reconstruct block 265 and the motion estimation block 270 provide a transform based, motion compensated, predictive engine for encoding, such as is used in the Motion Picture Experts Group (MPEG) encoding. The MPEG encoding provides a plurality of display frames wherein each display frame includes a plurality of display blocks. Other video encoding techniques such as H.261 and H.324 standards are also encoded in the similar manner.

For example, each picture is divided into groups of blocks (GOBs). A group of blocks (GOB) includes multiples of 16 lines depending on the picture format. Each GOB is divided into macroblocks. A macroblock relates to 16 pixels by 16 pixels of y, the luminance, and the spatially corresponding 8 pixels by 8 pixels of u and v, the two color components. Further, a macroblock includes four luminance blocks and the two spatially corresponding color difference blocks. Each luminance or chrominance block relates to 8 pixels by 8 pixels of y, u or v. A more detailed description is contained in Document LBC-95-251 of the International Telecommunication Union Telecommunication Standardization Sector Study Group 15 entitled "Draft Recommendations H.263 (Video coding for low bitrate communication)", contact Karel Rijkse, Tel: +31 70 332 8588; the Draft Recommendations H.263 (Video coding for low bitrate communication) is herein incorporated by reference in its entirety.

Figure 3:
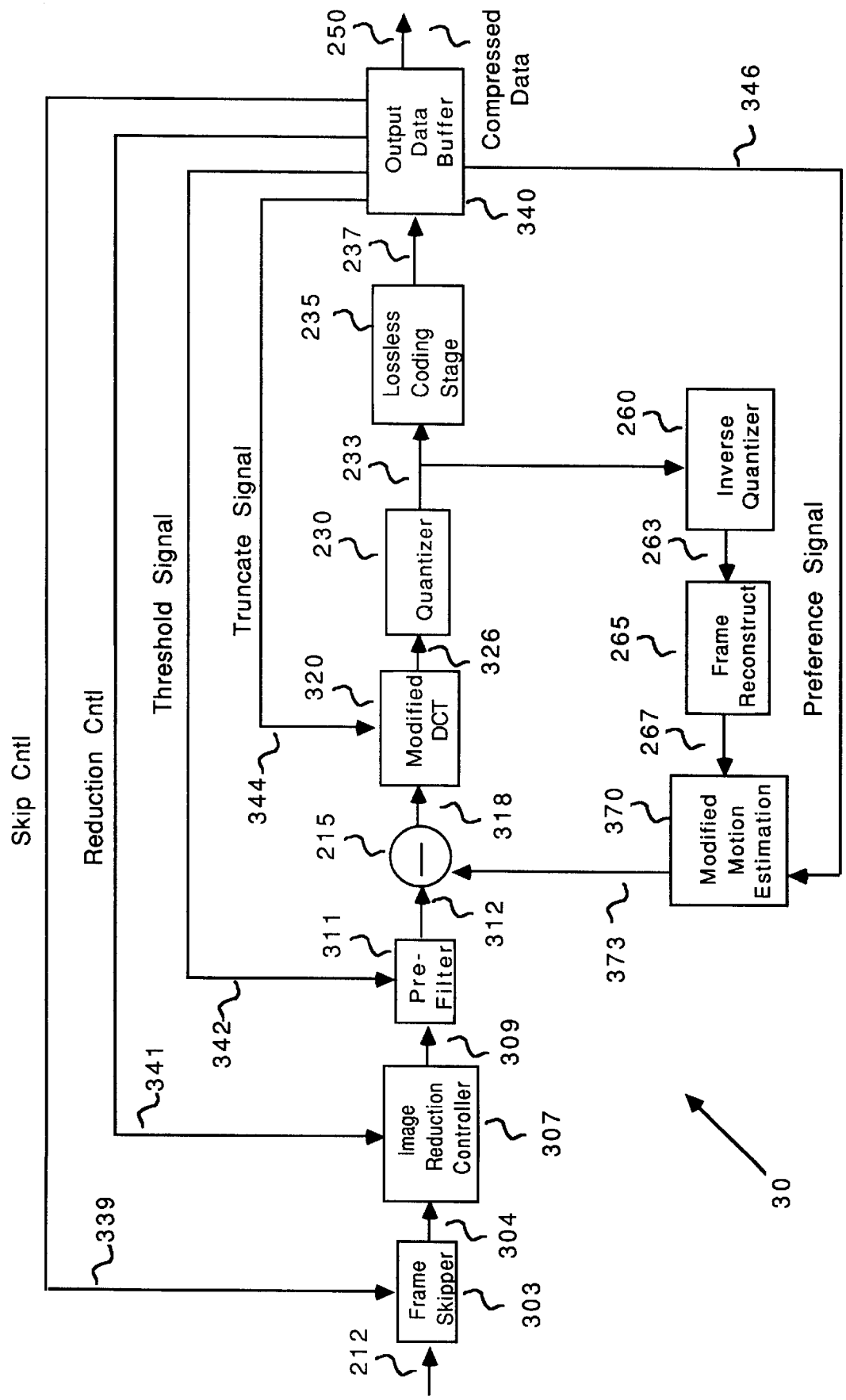
FIG. 3 illustrates a block diagram of a modified video encoder in accordance to the present invention.

FIG. 3 shows a block diagram of a modified video encoder 30 in accordance with the present invention. Frame skipper 303 receives the yuv data blocks on line 212 and provides image frame skipping of the incoming yuv data blocks. Image reduction controller 307 receives the yuv data blocks on line 304 and provides image size reduction of the yuv data blocks on line 309. Pre-filter component 311 receives the yuv data blocks from the image reduction controller 307 on line 309 and provides filtered yuv data blocks on line 312 to the subtractor 215. The subtractor 215 subtracts the motion estimation predicted data blocks from modified motion estimation block 370 on line 373 and the filtered yuv data blocks on line 312. Modified DCT 320 receives the output of subtractor 215 on line 318 and provides modified DCT data blocks on line 326. Quantizer 230 receives the modified DCT data blocks on line 326 and provides quantizer data blocks on line 233. The lossless coding stage 235 and the inverse quantizer 260 receives the quantizer data blocks on line 233. The inverse quantizer 260 provides inverse quantizer data blocks on line 263. The frame reconstruct block 265 receives the inverse quantizer data blocks and provides frame reconstruct data on line 267. The modified motion estimation block 370 receives the frame reconstruct data and provides the motion estimation predicted data blocks on line 373

The lossless coding stage 235 receives the quantizer data blocks on line 233 and provides lossless coded data blocks on line 237. Output data buffer 340 receives the lossless coded data blocks and provides the lossless compressed data on line 250. The output data buffer 340 also provides skip control signal on line 339 to the frame skipper 303, reduction control signal on line 341 to the image reduction controller 307, threshold signal on line 342 to the pre-filter component 311, truncate signal on line 344 to the modified DCT 320, and preference signal on line 346 to the modified motion estimation block 370 in response to the compressed data rate on line 250. Thus, the reduction control signal on line 339, the skip control signal on line 341, the threshold signal on line 342, the truncate signal on line 344, and the preference signal on line 346 alter parameters to its respective encoder component so that a constant output compressed data rate on line 250 is achieved.

As the frame skipper 303 receives the image data blocks on line 212, skip control signal on line 339 directs the frame skipper 303 to skip image data frames. Skipping image frames reduce the data rate of the incoming data blocks. The image reduction controller 307 receives the image data blocks on line 304 and the reduction control signal on line 341. The reduction control signal directs the image reduction controller 307 to reduce the image size of the incoming image data blocks. Interpolation of previous full size images maintains full image size at a receiver during intervals of reduced image size transmissions. Reducing the number of image data frames and the image size reduce the amount of encoded data bits.

Figure 4:
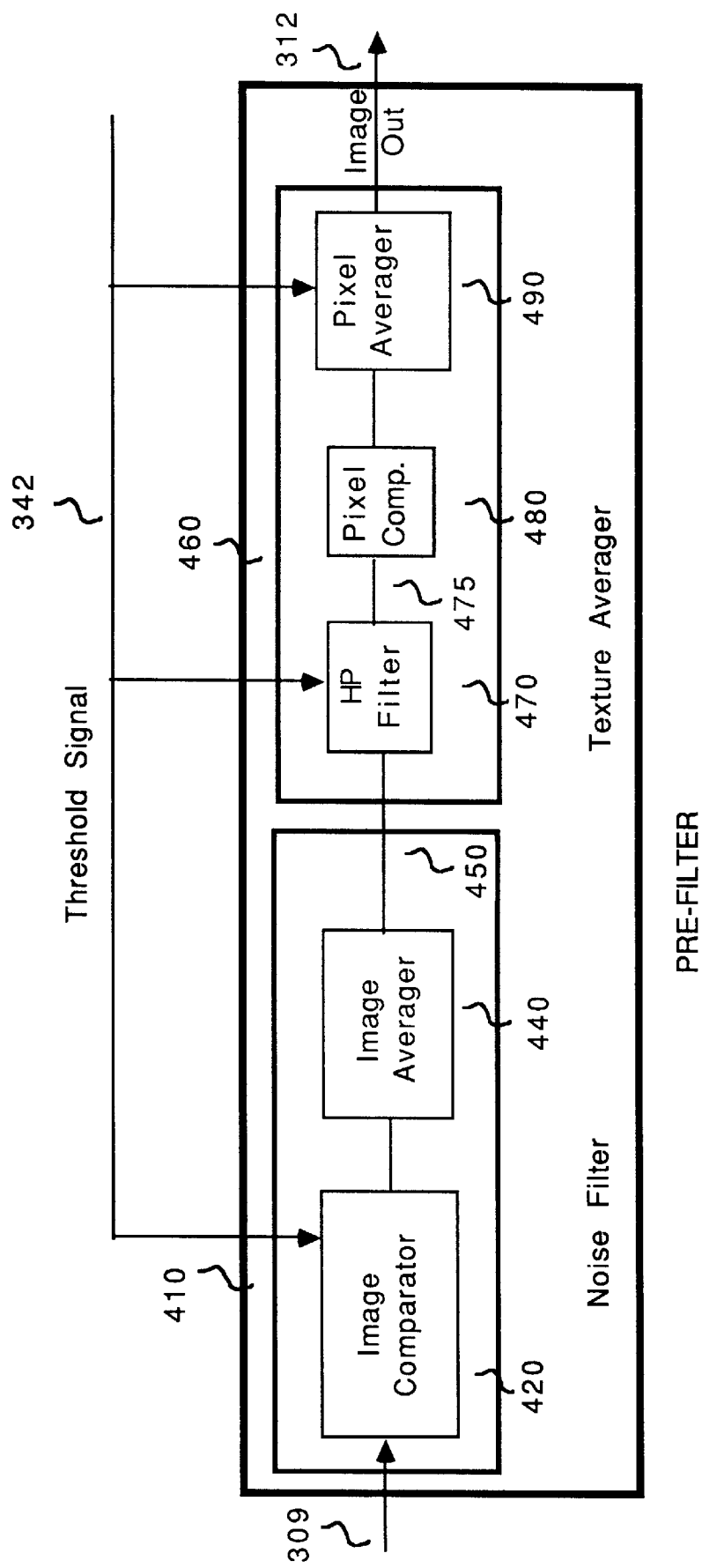
FIG. 4 illustrates a block diagram of the pre-filter component of the modified video encoder.

FIG. 4 shows a block diagram of the pre-filter component 311 of the modified video encoder 30. The pre-filter component 311 includes a noise filter 410 and a texture averager 460. The noise filter 410 filters noise present in the image blocks of the yuv data to reduce the amount of encoded data. The texture averager 460 identifies edges and reduces texture changes in the images of the yuv data to reduce the amount of encoded data.

The noise filter 410 includes an image comparator 420 and an image averager 440. The image comparator 420 receives the yuv data on line 309 and determines differences between a first image and a second image of the yuv data. Noise components of the images represent changes between the first image and the second image. The image comparator 420 computes the absolute value of the differences between a first image and a second image. The image comparator 420 also receives a threshold signal on line 342 which sets a threshold value for an absolute value difference between the first image and the second image. If the difference between the comparison of the first image and the second image from the image comparator is less than the threshold value, then the image comparator 420 signals the image averager 440 that this area in the images is to be averaged. The image averager 440 receives the first image and the second image from the image comparator 420 and averages the images to provide an averaged image for output on line 450. The averaged image from the image averager 440 affords images having reduced noise components. Images having reduced noise components offer more efficient coding of the images and reduce the amount of encoded data.

The texture averager 460 includes a high pass filter 470, pixel comparator 480, and a pixel averager 490. The high pass filter 470 receives the averaged image from the image averager 440 on line 450 and the threshold signal on line 342. The threshold signal provides the high pass filter 470 with a high pass threshold value. The high pass threshold value determines the filtering characteristics of the high pass filter. As the averaged image pass through the high pass filter 470, the high pass filter 470 identifies areas of the averaged image having a high rate of change and provides filtered data on line 475. The areas of high rate of change include areas having many data bits which signifies edges and textures in the image. Thus, the high pass filter identifies the edges and textures in the image.

The pixel comparator 480 receives the filtered data on line 475 and identifies the pixels of the edges and textures to average. The pixel comparator 480 determines the absolute value of the difference between the pixels of the edges and textures. The pixel averager 490 receives the absolute value of the difference between the pixels from the pixel comparator 480 and the threshold signal on line 342. The threshold signal on line 342 determines a threshold value for the pixel averager 490. As the pixel averager 490 receives the absolute value of the difference between the pixels of the edges and textures from the pixel comparator 480, the pixel averager 490 averages pixels of the edges and textures when the absolute value of the difference between the pixels is greater than the threshold value.

The pixel averager 490 reduces texture and edge changes associated with an image to reduce image data. The pixel averager 490 provides image out data on line 312 which provides the output for the texture averager 460. Thus, the texture averager 460 reduces the data bits associated with edges and textures of an image. Reducing the data bits associated with edges and textures of the image reduces the data rate of the image data entering the integrator 215.

Figure 5:
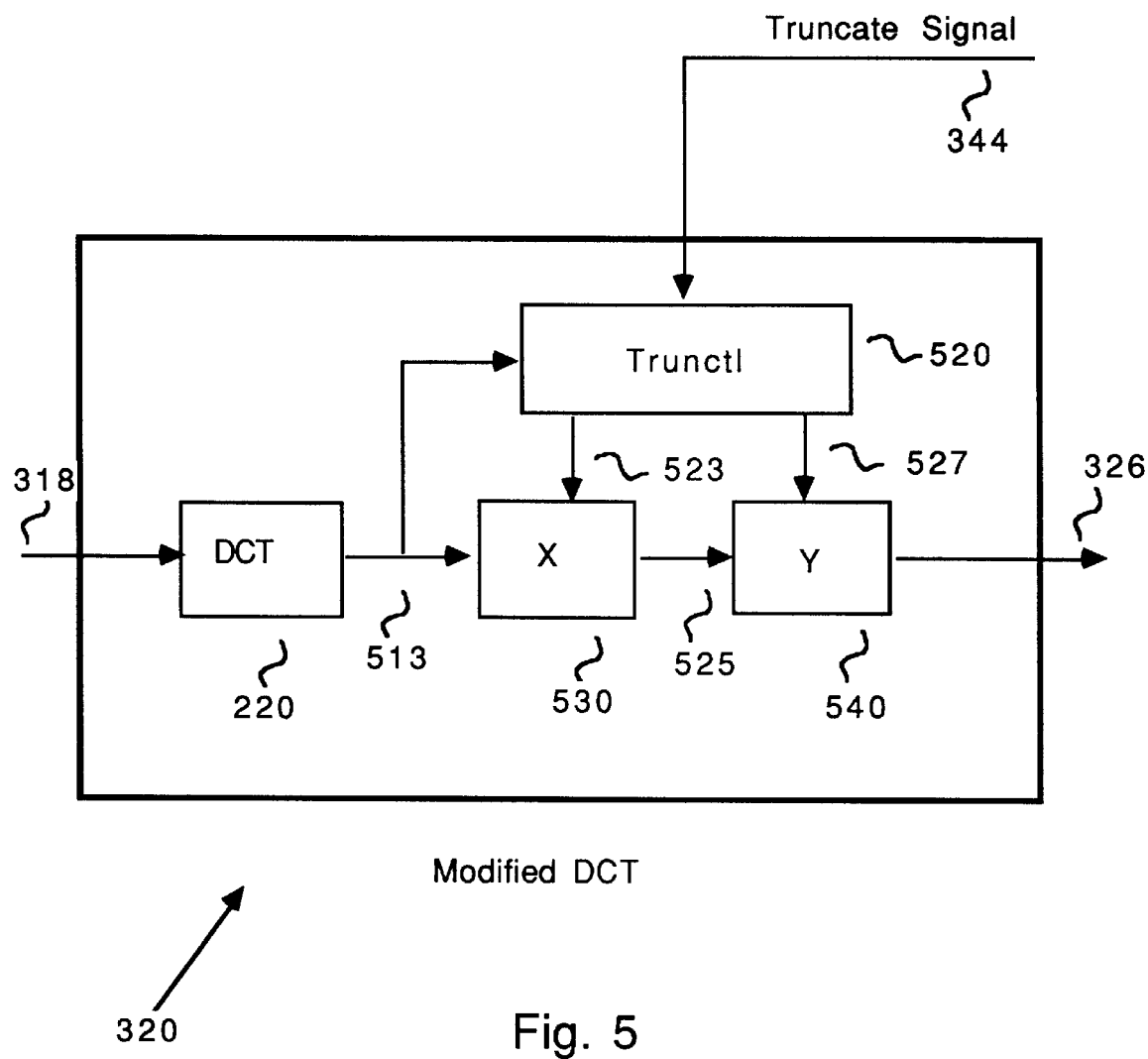
FIG. 5 illustrates a block diagram of the modified DCT block of the modified video encoder.

FIG. 5 shows a block diagram of the modified DCT block 320 of the modified video encoder 30. The modified DCT block 320 includes the DCT block 220, truncate controller 520, x-truncator 530, and y-truncator 540. The DCT 220 receives data blocks of n×n on line 318 and performs DCT transform on the n×n blocks of data. The output of DCT block 220 provides DCT coefficients for the n×n blocks of data having x-coordinate data and y-coordinate data on line 513. The truncate controller 520 and the x-truncator 530 receives the DCT coefficients on line 513. The truncate controller 520 receives truncate signal on line 344 which controls the degree of truncation performed by the truncate controller 520.

The truncate controller 520 includes circuitry which determines the extent of the truncation of the DCT coefficients in response to the received DCT coefficients on line 513 and the truncate signal on line 344. The truncate controller 520 provides an x-truncate signal on line 523 to truncate x-coordinate data of the n×n blocks of data. The x-truncator 530 passes the truncated x-coordinate data of the n×n blocks of data on line 525 to the y-truncator 540.

As the y-truncator 540 receives the truncated x-coordinate data on line 525, the truncate controller 520 provides a y-truncate signal on line 527 to truncate y-coordinate data of the n×n blocks of data. The y-truncator 540 provides truncated x-coordinate data and truncated y-coordinate data on line 326. The truncated n×n blocks of data provide the output for the modified DCT block 320.

The x-truncator 530 and the y-truncator 540 substitute zeros for the DCT x-coordinate and y-coordinate coefficients, respectively. The DCT coefficients provides detail and texture information for the encoded images. Truncating the DCT coefficients that provide high detail and texture with zeros reduces the amount of encoded data bits. Furthermore, substituting zeros for DCT coefficients embed Q in the transform which controls the number of zeros explicitly during quantizing by the quantizer 230. Increasing the number of zeros during quantizing reduces the amount of encoded data bits.

According to another embodiment of the modified DCT block 320, the truncate controller 520 includes circuitry that sorts the DCT coefficients according to the magnitude of the DCT coefficients. In the present embodiment, there are a total of 64 coefficients possible non-zero DCT coefficients resulting from the 8×8 blocks of data. As the DCT coefficients are sorted according to magnitude, the truncate signal on line 344 provides a truncate number that determines the number of DCT coefficients which are retained out of the possible 64 coefficients. The remainder of the DCT coefficients that are not retained is set to zero. Accordingly, the amount of encoded data bits is reduced by reducing the number of DCT coefficients while the bulk of the detail and texture information contained with the DCT coefficients having the greatest magnitude for the n×n blocks of data are retained.

Figure 6:
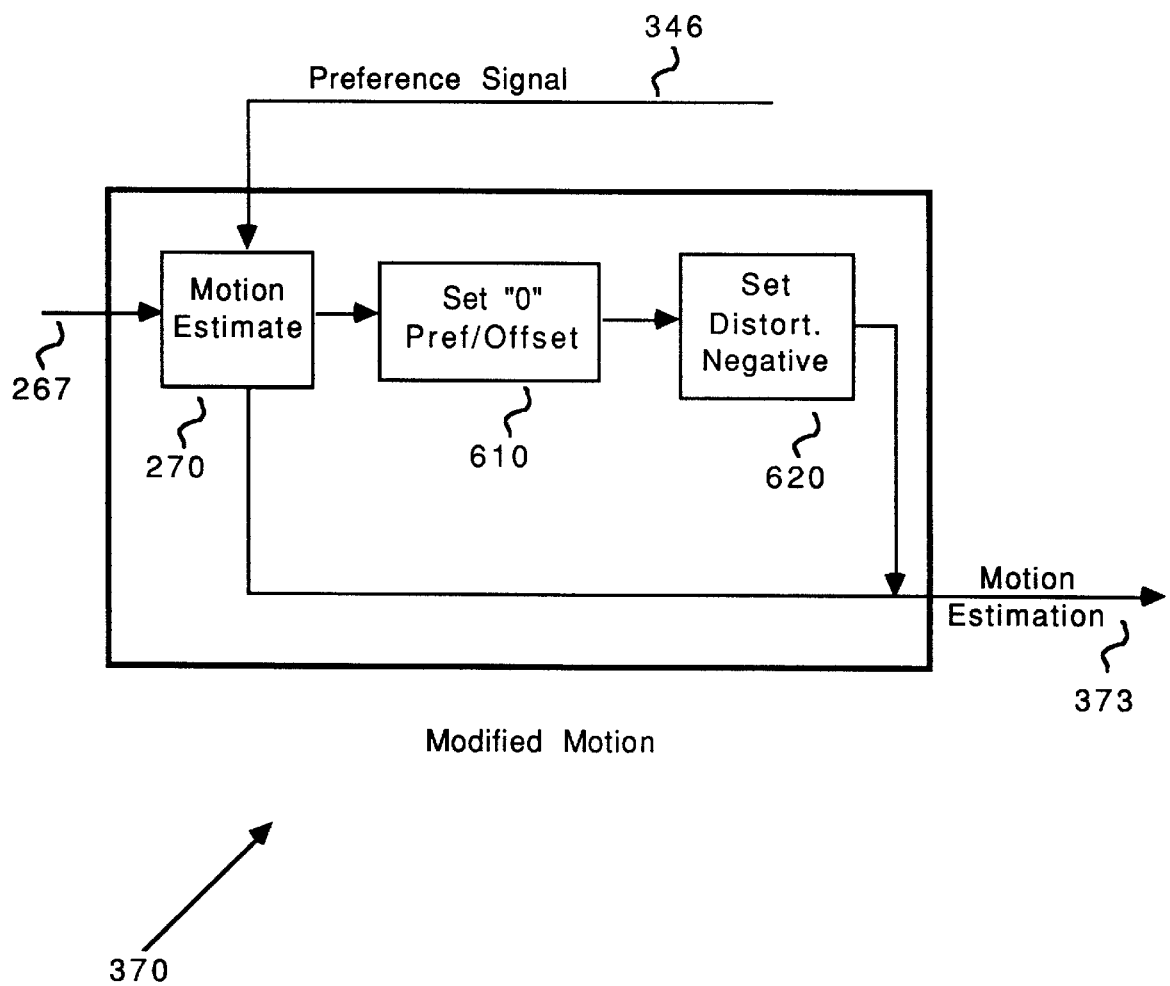
FIG. 6 illustrates a block diagram of the modified motion block of the modified video encoder.

FIG. 6 shows a block diagram of the modified motion block 370 of the modified video encoder 30. The modified motion block 370 includes the motion estimation block 270, set preference/offset block 610, and set distortion negative block 620. The motion estimation block 270 receives data blocks on line 267 for motion estimation and the preference signal on line 346. When the preference signal on line 346 becomes active, the motion estimation block 270 directs its output to the set preference/offset block 610, else the output is directed to line 373. The set preference/offset block 610 attaches the preference to the motion vector to zero vector and passes the data blocks to the set distortion negative block 620. The set distortion negative block 620 sets a negative distortion value for the motion estimation and passes the result to line 373.

Attaching preference to zero vector causes the zero motion vector to be chosen in preference to non zero motion vectors which greatly reduces the amount of time and data bits required to perform the motion estimation. Furthermore, setting the distortion value to a negative number avoids additional searching and computation for the motion vector because the distortion value is always a positive number under normal motion estimation mode. Thus, in response to the preference signal on line 346, the motion estimation block 270 directs the motion estimation to line 373 for output or to the set preference/offset block 610. When the preference signal on line 346 becomes active, the modified motion estimation block 370 operates in motion estimation compression mode which reduces the amount of encoded data bits.

Figure 7:
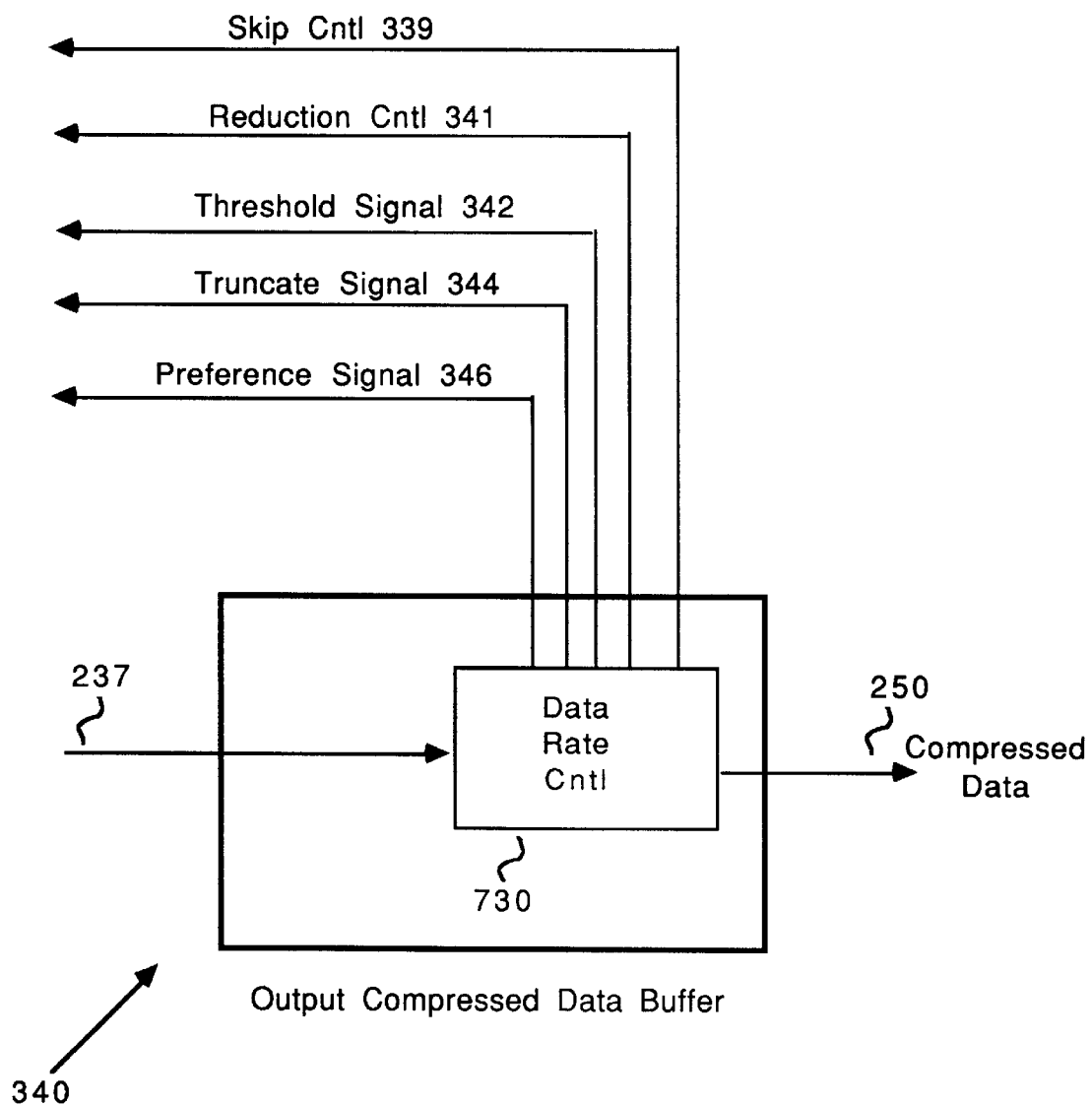
FIG. 7 illustrates a block diagram of the output data buffer of the modified video encoder.

FIG. 7 shows a block diagram of the output compressed data buffer 340 of the modified video encoder 30. The output compressed data buffer 340 includes a data rate controller 730 that receives lossless encoded data blocks on line 237 and provides the lossless compressed data on line 250. The data rate controller 730 provides the skip control signal on line 339, the reduction control signal on line 341, the threshold signal on line 342, the truncate signal on line 344, and the preference signal on line 346 in order to maintain a constant bit rate of the lossless compressed data on line 250. Thus, the data rate controller 730 issues the control signals as required to constrain the components of the encoder 30 to generate a fixed amount of data per unit time. The data rate controller 730 further includes circuitry which handshakes with a receiver to dynamically negotiate transfer speed as line conditions vary during image transfers.

Maintaining a constant data rate is a well known problem that occurs in a variety of disciplines including networking, communication over variable rate channels as well as data compression. The various control signals of the data rate controller 730 are derived in any of a multitude of ways from the error between the actual data rate generated and the fixed rate required of the communications channel or storage device to which the compressed data is to be sent. Those skilled in the art will readily appreciate the many implementations of the various control signals to suit their specific system requirements which depend on the particular characteristic of data being transferred. One obvious way to generate the control signals is to calculate the error between the actual and desired rate where the error, e, is equal to the actual rate or some function of the error a, minus the desired rate, d, such that e=a−d. A lookup table with the error as table index generates the control signal. For example, with respect to the skip control signal on line 339, a table entry for skip_table[e]=skip_ctrl contains a threshold which turns skip_ctrl on or off depending on the magnitude of the error, e.

These lookup tables can be either fixed or adaptive and are defined with reference to the relative importance of the control mechanisms. For example skipping frames would usually be considered more extreme than truncation and consequently would be used more sparingly. Other obvious but more sophisticated algorithms are often used, for example the error signal may be modified using the well known PID (proportional, Integral, Derivative) controller before it is used for generating the control signals.

The various parameters of the video encoder 30 that are alterable provide a constant data rate output to be generated. Depending on the deviation from the desired data rate, the various parameters available to the data rate controller 730 afford high quality images while maintaining a constant data rate at the output of the encoder 30.

While the foregoing detailed description has described several embodiments of the apparatus and methods for controlling the data rate of an encoder in accordance with this invention, it is to be understood that the above description is illustrative only and not limiting of the disclosed invention. Obviously, many modifications and variations will be apparent to the practitioners skilled in this art. Accordingly, the apparatus and methods for controlling the data rate of an encoder have been provided. The controllable data rate encoder affords data transfers over fixed bandwidth networks that provide smoother video images during transfers of video data.

What is claimed is:

1. A video encoder for encoding input images having a plurality of data blocks and providing compressed frames as output image data comprising:

DCT (discrete cosine transformer) resources having a truncate controller configured to receive a truncate signal to truncate transformed data blocks to provide reduced data blocks;

quantizing resources coupled to the DCT resources to quantize the reduced data blocks to provide quantized data blocks;

inverse quantizing resources coupled to the quantizing resources to inverse quantize the quantized data blocks;

frame reconstruction resources coupled to the inverse quantizing resources to reconstruct previous compressed frames;

motion estimation resources coupled to the frame reconstruction resources to provide predicted data blocks;

subtraction resources coupled to an input of the DCT resources and an output of the motion estimation resources to subtract the data blocks and the predicted data blocks; and an output data buffer having a data rate controller coupled between the quantizing resources and the inverse quantizing resources to provide the truncate controller the truncate signal in response to excessive output image data rates so that a constant output image data rate is maintained.

2. The video encoder of claim 1, wherein the truncate controller selectively truncates the data blocks to provide the reduced data blocks in response to the truncate signal.

3. The video encoder of claim 2, wherein the data blocks include a plurality of n×n blocks of data and the truncate controller truncates the n×n blocks to provide n−y×n−y blocks of reduced data blocks.

4. The video encoder of claim 3, wherein n represents an integer 8 and y represents an integer less than 8.

5. The video encoder of claim 1, wherein:

each data block includes a plurality of x coordinate data and y coordinate data; and the truncate controller includes an x-truncator which truncates the x coordinate data of the data blocks and a y-truncator which truncates the y coordinate data of the data blocks independent of the x truncator.

6. The video encoder of claim 1 further comprising:

pre-filtering resources coupled to the DCT resources having image comparator resources configured to receive a threshold signal and compare input images to provide compared input images; and image averaging resources configured to receive the compared input images and average the compared input images to provide input images having reduced data blocks.

7. The video encoder of claim 6 wherein the pre-filtering resources includes texture averager resources configured to identify areas of an input image having high rates of change and average the areas of high rates of change in response to the threshold signal.

8. The video encoder of claim 1, wherein the data rate controller includes an image size control output configured to provide a reduction control signal and the video encoder further comprises image reduction controller resources having an image reduction input configured to reduce image magnitudes in response to the reduction control signal.

9. The video encoder of claim 1, wherein the data rate controller includes a frame skipper control output configured to provide a frame skipping signal and the video encoder further comprises frame skipping resources having a frame skipping input configured to skip image frames in response to the frame skipping signal.

10. The video encoder of claim 1, wherein the data rate controller includes a motion preference output configured to provide a preference signal in response to excessive output image data rates; and the motion estimation resources includes motion preference resources having a preference input configured to set motion preference to prefer the zero vector in response to the preference signal.

11. A computer readable media for video encoding of input images having a plurality of data blocks and providing compressed frames as output image data comprising:

DCT (discrete cosine transformer) resources having truncating resources configured to receive a truncate signal to truncate transformed data blocks to provide reduced data blocks;

quantizing resources configured to quantize the reduced data blocks to provide quantized data blocks;

inverse quantizing resources configured to inverse quantize the quantized data blocks to provide inverse quantized data blocks;

frame reconstruction resources coupled to the inverse quantizing resources to reconstruct a previous compressed frame;

motion estimation resources configured to provide predicted data blocks;

subtraction resources configured to subtract the data blocks and the predicted data blocks and provide subtracted data blocks to the DCT resources; and an output data buffer having data rate controlling resources configured to provide the truncating resources the truncate signal in response to excessive output image data rates so that a constant output image data from the output data buffer is maintained.

12. The computer readable media of claim 11, wherein:

each data block includes a plurality of x coordinate data and y coordinate data; and the truncating resources includes x-truncator resources which truncates the x coordinate data of the data blocks and y-truncator resources which truncates the y coordinate data of the data blocks independent of the x-truncator.

13. The computer readable media of claim 11 further comprising:

pre-filtering resources having image comparator resources configured to receive a threshold signal and compare input images to provide compared input images; and image averaging resources configured to receive the compared input images and average the compared input images to provide input images having reduced data blocks.

14. The computer readable media of claim 11, wherein the data rate controlling resource includes a motion preference output configured to provide a preference signal in response to excessive output image data rates; and the motion estimation resources includes motion preference resources having a preference input configured to set motion preference to prefer the zero vector response to the preference signal.

15. A method of encoding input images having a plurality of data blocks to provide constant output image data rates of compressed frames comprising the steps:

discrete cosine transforming the data blocks to provide DCT data blocks;

truncating DCT (discrete cosine transformer) data blocks to provide reduced data blocks in response to a truncate signal;

quantizing the reduced data blocks to provide quantized data blocks;

inverse quantizing the quantized data blocks to provide inverse quantized data blocks;

frame reconstructing to provide a previous compressed frame;

motion estimating to provide predicted data blocks from the plurality of data blocks;

subtracting the data blocks and the predicted data blocks; and controlling excessive output image data rates by providing the truncate signal to reduce the output image data rates.

16. The method of encoding input images according to claim 15, wherein each data block includes a plurality of x coordinate data and y coordinate data and the step of truncating DCT data blocks includes truncating x coordinate data independent of y coordinate data.

17. The method of encoding input images according to claim 15, wherein the step of controlling excessive output image rates includes the step of providing a threshold signal and further comprising the step pre-filtering the input images to reduce texture and edge data associated with the input images.

18. The method of encoding input images according to claim 15, wherein the step of controlling excessive output image rates includes the step of providing an image reduction signal and further comprising the step reducing the output image data in response to the image reduction signal.

19. The method of encoding input images according to claim 15, wherein the step of controlling excessive output image rates includes the step of providing a frame skipping signal and further comprising the step skipping output image data to reduce image frames in response to the image reduction signal.

20. The method of encoding input images according to claim 15, wherein:

the step of controlling excessive output image rates includes the step of providing a preference signal; and the step of motion estimating includes the step of setting motion preference to zero in response to the preference signal.

* * * * *